Z. B. SIMS.
Draft Equalizers.
No. 106,084.  Patented Aug. 2, 1870.
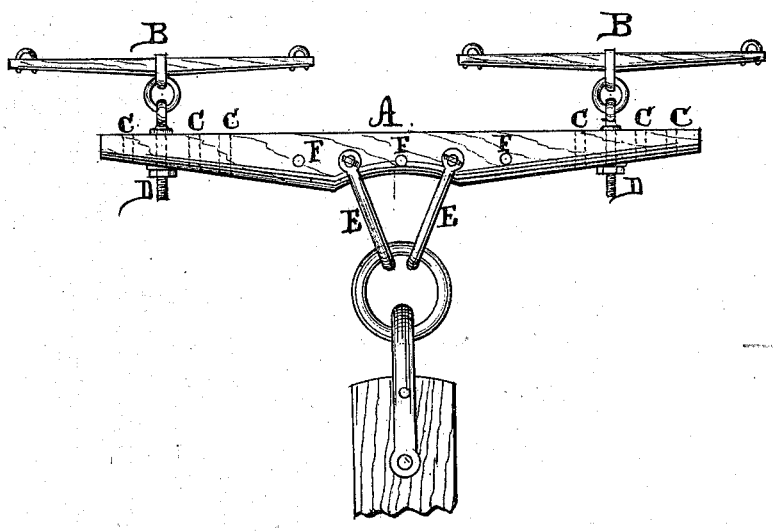

United States Patent Office.

ZACHARIAH B. SIMS, OF BONHAM, TEXAS.

Letters Patent No. 106,084, dated August 2, 1870.

IMPROVEMENT IN TWO-HORSE EQUALIZERS.

The Schedule referred to in these Letters Patent and making part of the same

*To all whom it may concern:*

Be it known that I, ZACHARIAH B. SIMS, of Bonham, in the county of Fannin and State of Texas, have invented a new and useful Improvement in Two-Horse Equalizers; and I do hereby declare the following to be a clear and exact description of the nature thereof, sufficient to enable others skilled in the art to which my invention appertains to make and use the same, reference being had to the accompanying drawing, in which the figure is a top or plan view thereof.

My invention is an improvement in the class of equalizers adapted for two horses, as will be hereinafter more fully described.

In the drawing—

A represents a double-tree, and

B B, single or whiffletrees.

The connection between the said double and whiffletrees is as follows:

A series of longitudinal openings, C C, is made in the double-tree, and into these openings are inserted the bolts D, which carry hooks, eyes, or rings, from which whiffletrees are hung.

It will be seen that the whiffletrees may readily be brought nearer together or separated from each other by simply moving the bolts and introducing them into the relative opening in the double-tree.

E E are stretcher-loops, which are connected to the double-trees and to the plow-beam or plow-clevis.

These stretchers may be adjusted to increase or decrease the leverage of the double-trees by means of openings F F in the double-trees.

The operation is as follows:

When the animals are of about equal strength, the bolts carrying the hook-eyes are adjusted in the openings formed in the double bar, at equal distances from its ends, the stretcher irons remaining in either the center or outer holes of the double bar, the equalization thus being perfect; but, if the animals should be of unequal strength, either of the bolts carrying the hook-eyes may be moved inwardly, or one arm of the stretcher-chains or irons may be adjusted inwardly, thus allowing each animal to perform its proper share of the work, and preventing the constant jerking which is a common occurrence in single-trees and double vans heretofore in use.

Having thus described my invention,

What I claim as new, and desire to secure by Letters-Patent, is—

The double-tree A, provided with a series of longitudinal openings, C C C, and the openings F F, as described, when combined and operating in connection with the stretcher-loops E E and whiffletrees B B, substantially as set forth.

The above signed by me this 11th day of February, 1870.

Z. B. SIMS.

Witnesses:
M. W. BLEDSOE,
D. P. LANIUS.